(12) United States Patent
Yang et al.

(10) Patent No.: US 9,288,510 B1
(45) Date of Patent: Mar. 15, 2016

(54) ADAPTIVE VIDEO TRANSCODING BASED ON PARALLEL CHUNKED LOG ANALYSIS

(71) Applicant: Google Inc., Mountain View, CA (US)

(72) Inventors: Lei Yang, Fremont, CA (US); Prasanna Meda, Santa Clara, CA (US); Thierry Foucu, San Jose, CA (US); Sang-Uok Kum, Sunnyvale, CA (US); Hugh Pierre Denman, San Francisco, CA (US); Steve Benting, San Mateo, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/285,546

(22) Filed: May 22, 2014

(51) Int. Cl.
*H04N 7/173* (2011.01)
*H04N 21/2343* (2011.01)
*H04N 19/40* (2014.01)
*H04N 19/51* (2014.01)
*H04N 19/124* (2014.01)
*H04N 19/593* (2014.01)
*H04N 19/176* (2014.01)

(52) U.S. Cl.
CPC ... *H04N 21/234309* (2013.01); *H04N 19/0009* (2013.01); *H04N 19/00278* (2013.01); *H04N 19/00472* (2013.01); *H04N 19/00684* (2013.01); *H04N 19/00763* (2013.01)

(58) Field of Classification Search
None
See application file for complete search history.

(56) References Cited

U.S. PATENT DOCUMENTS

| | | | |
|---|---|---|---|
| 8,855,189 B1* | 10/2014 | Krause et al. | 375/240 |
| 2009/0086816 A1* | 4/2009 | Leontaris et al. | 375/240.03 |
| 2011/0087794 A1* | 4/2011 | Li et al. | 709/231 |
| 2012/0269258 A1* | 10/2012 | Yang et al. | 375/240.02 |
| 2013/0117418 A1* | 5/2013 | Mutton et al. | 709/219 |
| 2013/0308638 A1* | 11/2013 | Grossman et al. | 370/390 |
| 2013/0312048 A1* | 11/2013 | Grossman | 725/109 |
| 2014/0140417 A1* | 5/2014 | Shaffer et al. | 375/240.28 |
| 2014/0153909 A1* | 6/2014 | MacInnis et al. | 386/353 |
| 2014/0376616 A1* | 12/2014 | Li et al. | 375/240.03 |

* cited by examiner

*Primary Examiner* — Fernando Alcon
(74) *Attorney, Agent, or Firm* — Fenwick & West LLP (57) ABSTRACT

Adaptive video transcoding based on parallel chunked log analysis is described. The adaptive video transcoding method comprises receiving an intermediate video stream generated from an intermediate transcoding. The method also receives an intermediate transcoding log stream associated with the intermediate video stream. The method partitions the intermediate video stream into a plurality of video chunks, where each video chunk corresponding to a portion of video data of the video stream. The method further generates video chunk statistics for each of the video chunks using the intermediate transcoding log stream and transcoding parameters for each of the video chunks based on the generated video chunk statistics. The method transcodes each of the video chunks to a target format in parallel based on the generated transcoding parameters. The method assembles the transcoded video chunks into a target video stream in the target format.

17 Claims, 6 Drawing Sheets

ADAPTIVE VIDEO TRANSCODING BASED ON PARALLEL CHUNKED LOG ANALYSIS

BACKGROUND

Described embodiments relate generally to streaming data processing, and more particularly to adaptive video transcoding based on parallel chunked log analysis.

Streaming transcoding is used, for example, for accommodating video live streaming and fast rendering of video-goes-live. Streaming transcoding involves transcoding the start of an incoming video bit stream while fetching the remainder of the incoming video stream. In the cases of real-time video broadcasting or video conferencing, real-time video transcoding is required. End-to-end latency starting from video uploading until the video goes live is desired to be as small as possible. Therefore, in such cases the streaming transcoding is preferred to reduce the latency.

SUMMARY

Disclosed embodiments include methods, systems and computer program products that provide adaptive video transcoding based on parallel chunked log analysis.

In one embodiment, the adaptive video transcoding system includes a chunk transcoder master having a de-multiplexer/splitter, a chunk controller and a merger; and a pool of video chunk transcoder slaves for providing video transcoding services in parallel. The splitter receives an intermediate video stream with an intermediate format, where the intermediate video stream being transcoded based on an intermediate transcoding. The splitter also receives an intermediate transcoding log stream associated with the intermediate video stream. The splitter partitions the intermediate video stream into a sequence including a plurality of video chunks, where a video chunk corresponds to a portion of video data of the video stream, and generates video chunk statistics for the video chunks based on the intermediate transcoding log stream. The chunk controller generates transcoding parameters for the video chunks based on the video chunk statistics, and transmits one or more video chunks and transcoding parameters for the one or more video chunks to one or more chunk transcoder slaves for parallel transcoding of the video chunks based on the transcoding parameters for the video chunks. Upon receiving the one or more video chunks and the transcoding parameters for the one or more video chunks, the one or more chunk transcoder slaves can transcode the video chunks based on the transcoding parameters for the video chunks in parallel. Each chunk transcoder slave produces a transcoded video chunk with a target format. The merger assembles the transcoded video chunks to a target video stream with the target format based on their order in the sequence.

Another embodiment includes a computer method for adaptive video transcoding based on parallel chunked log analysis. A further embodiment includes a non-transitory computer-readable medium that stores executable computer program instructions for adaptive video transcoding in the manner described above.

While embodiments are described primarily with respect to transcoding video, in other embodiments, audio or any other suitable media may be processed.

The described embodiments utilize an intermediate transcoding log to guide target encoding adapting to the video properties/content in streaming mode. Embodiments also provide a way to utilize chunked intermediate transcoding logs to guide chunked target encoding in streaming mode, where the intermediate transcoding log is analyzed in parallel with both the intermediate transcoding and target chunked transcoding. This enables, for example, adaptive transcoding based on the intermediate transcoding log analysis, and reduction of temporary storage required for the intermediate transcoding logs due to streaming, especially for very long videos. In addition, the video chunk statistics can be saved for the optimization of any further encoding passes, or transcoding runs. Furthermore, each log entry in the transcoding logs corresponds to one video frame. Thus, the number of log entries parsed in streaming mode compared with total number of frames in the videos provides an indicator of the progress of the encoding pass.

Described embodiments also provide an online real-time analysis during transcoding without introducing significant extra delay, and therefore can be used for online or batch transcoding optimization. In addition, video chunk statistics obtained from the intermediate transcoding logs provides a way to guide the target transcoding. Based on the video chunk statistics obtained from the intermediate transcoding logs, target transcoding can save unnecessary computation and bit rate on simple video chunks and improve the quality of complex video chunks.

The figures depict various embodiments of the invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

Figure 1:
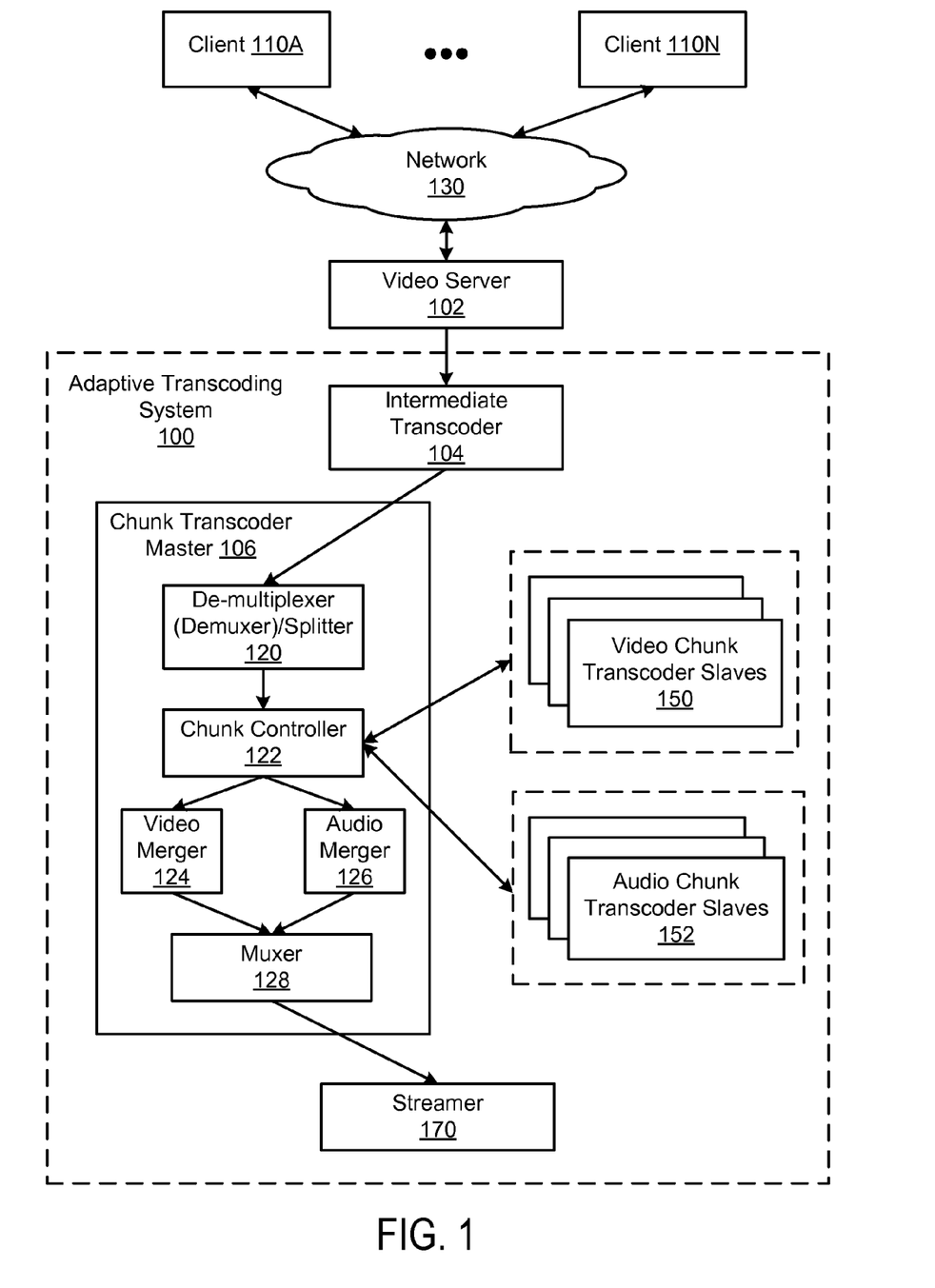
FIG. 1 is a block diagram illustrating an adaptive transcoding system according to one embodiment.

FIG. 1 is a block diagram illustrating an adaptive transcoding system 100. Multiple users/viewers use one or more clients 110A-N to upload videos and also receive videos from a video server 102. The video server 102 communicates with the one or more clients 110A-N via a network 130. The video server 102 receives the uploaded videos and sends the videos to be transcoded to the adaptive transcoding system 100. The adaptive transcoding system 100 receives the videos uploaded by the clients 110A-N, transcodes the video in streaming mode and returns the transcoded video streams to the other clients 110A-N or to other services processing units. The adaptive transcoding system 100 can also be a part of a cloud computing system.

Turning to the individual entities illustrated on FIG. 1, each client 110 is configured for use by a user to request videos. The client 110 can be any type of computer device, such as a personal computer (e.g., desktop, notebook, laptop) computer, as well as devices such as a mobile telephone, personal digital assistant, IP enabled video player. The client 110 typically includes a processor, a display device (or output to a display device), a local storage, such as a hard drive or flash memory device, to which the client 110 stores data used by the user in performing tasks, and a network interface for coupling to the system 100 via the network 130.

The network 130 enables communications between the clients 110 and the video server 102. In one embodiment, the network 130 is the Internet, and uses standardized internetworking communications technologies and protocols, known now or subsequently developed that enable the clients 110 to communicate with the video server 102.

The video server 102 receives user requests for videos from the clients 110. In one embodiment, the video server 102 also receives videos uploaded from the clients 110 by users. For example, a first user (e.g., a live broadcaster) provides a stream of video online that can be watched by a second user. The video server 102 receives the uploaded video and transmits it to the adaptive transcoding system 100 for transcoding and streaming the video to enable the second user to watch the video. In another example, the video server 102 receives requests for conference videos by a group of users using the clients 110 to have a conference meeting. The video server 102 also receives uploaded conference videos from the group of users in the meeting. The video server 102 sends uploaded videos (e.g., the conference videos uploaded by users) to the adaptive transcoding system 100 for transcoding and streaming the videos back to users. For example, an uploaded video may be in a specific format, and the clients 110 may not be compatible with the specific format. Accordingly, the uploaded video may be transcoded to a second format compatible with the clients 110. The uploaded videos received by the video server 102 may be referred to as "source videos."

The adaptive transcoding system 100 has an intermediate transcoder 104, a video database 190, a chunk transcoder master 106, a pool of video chunk transcoder slaves 150, a pool of audio chunk transcoder slaves 152, and a streamer 170. The adaptive transcoding system 100 can also function as a video streaming server to stream the processed videos to clients 110.

The intermediate transcoder 104 receives videos from the video server 102 and transcodes the videos to an intermediate format. The transcoding of a video from an original format to an intermediate format may be referred to as an intermediate transcoding. Examples for original format of video can include moving picture experts group (MPEG)-1, MPEG-2, advance streaming format (ASF), etc. The video transcoded through the intermediate transcoding may be referred to as the intermediate video. The intermediate transcoding can be considered as lossless, i.e., the intermediate video preserves information/properties of the source video. The intermediate videos may have a universal intermediate format, e.g., moving picture experts group (MPEG), etc. Other intermediate video formats known to those of ordinary skill in the art are also within the scope of the invention. In one embodiment, the intermediate transcoder 104 transcodes videos with different original formats to a universal intermediate format. The intermediate videos may be further transcoded by other entities of the adaptive transcoding system 100 from the intermediate format to different target formats. Examples for target formats of videos can include MPEG-2, MPEG-4, and other formats desired by the implementer suitable for display on computers, tablets, smartphones, etc. In one embodiment, the intermediate transcoder 104 also generates an intermediate transcoding log associated with the intermediate video. The intermediate transcoding log may include rich information obtained from the intermediate transcoding of the video. For example, the intermediate transcoding log of the intermediate transcoding includes information describing properties for each frame of the intermediate video (or the source video, as the intermediate video preserves properties of the source video).

In one embodiment, the intermediate transcoder 104 transmits the intermediate video and the intermediate transcoding log associated with the intermediate video to the chunk transcoder master 106 in a streaming mode. For example, the intermediate transcoder 104 sends the intermediate video in an intermediate video bit stream. Similarly, the intermediate transcoder 104 transmits the intermediate transcoding log in an intermediate transcoding log stream. In one embodiment, the intermediate transcoder 104 parses the intermediate transcoding log and transmits the parsed intermediate transcoding log in a stream to the chunk transcoder master 106.

The chunk transcoder master 106 receives the intermediate video as well as the intermediate transcoding log in streams from the intermediate transcoder 104, partitions the intermediate video stream and the intermediate transcoding log stream, and controls the video chunk transcoder slaves 150 and the audio chunk transcoder slaves 152 to transcode the video stream to a target format based on the partitioned intermediate transcoding log stream. This transcoding of the video may be referred to as a target video transcoding, herein. The transcoded video with the target format may be referred to as a target video. In one embodiment, the chunk transcoder master 106 may transmit the target video to the streamer 170 that streams the target video for returning the target video to the clients 110 via the video server 102. The chunk transcoder master 106 has a demuxer/splitter 120, a chunk controller 122, a video merger 124, an audio merger 126, and a muxer 128.

The demuxer/splitter 120 receives the intermediate video as well as the intermediate transcoding log in streaming mode from the intermediate transcoder 104 and partitions the intermediate video stream and the intermediate transcoding log stream into a sequence including multiple temporal sections of the video stream (also referred to as video chunks from herein). The demuxer/splitter 120, as well as the partitioning of the video stream, will be described in further detail below with reference to FIG. 2.

In one embodiment, the demuxer/splitter 120 also generates video chunk metric or statistics for the video chunks using the intermediate transcoding log stream. For example, the demuxer/splitter 120 generates per-chunk video statistics describing statistic properties for each video chunk. The demuxer/splitter 120 transmits the video chunks and the video statistics for the video chunks to the chunk controller 122 for controlling one or more of the video chunk transcoder slaves 150 to perform the target video transcoding service in parallel.

In one embodiment, the demuxer/splitter 120 de-multiplexes the received intermediate video by separating embedded audio from the video. Furthermore, the demuxer/splitter 120 may partition the separated audio into a sequence of multiple temporal sections of the audio (also referred to as "audio chunks" herein), and also generate audio statistics describing statistic properties of the audio chunks. The demuxer/splitter 120 transmits the audio chunks and the audio statistics for the audio chunks to the chunk controller 122 for controlling one or more of the audio chunk transcoder slaves 152 to perform the audio transcoding service in parallel. In addition, the chunk controller 122 may also control the one or more of the video chunk transcoder slaves 150 and the one or more of the audio chunk transcoder slaves 152 to perform the audio transcoding service and the video transcoding service in parallel.

A video chunk transcoder slave 150 is a computing device. In one embodiment, the chunk controller 122 determines transcoding parameters for each video chunk based on video statistics for the video chunk and transmits each video chunk and the transcoding parameters to a selected video chunk transcoder slave 150. The determination of transcoding parameters for video chunks based on video statistics will be described in further detail with reference to FIGS. 2 and 3. The video chunk transcoder slaves 150 transcode their respective video chunks based on the transcoding parameters for the respective video chunks in parallel. In one embodiment, the video chunk transcoder slaves 150 return the transcoded target video chunks back to the chunk controller 122 in a streaming mode.

Similarly, an audio chunk transcoder slave 152 is also a computing device. In one embodiment, the chunk controller 122 determines transcoding parameters for each audio chunk based on audio statistics for the audio chunk and transmits each audio chunk and the transcoding parameters for the audio chunk to a selected audio chunk transcoder slave 150. The audio chunk transcoder slaves 152 transcode their respective audio chunks based on the transcoding parameters for the respective audio chunks in parallel. In one embodiment, the audio chunk transcoder slaves 152 return the transcoded audio chunks back to the chunk controller 122 in a streaming mode.

The chunk controller 122 passes the transcoded video chunks to the video merger 124, and the transcoded audio chunks to the audio merger 126. The video and audio merger 124, 126 merges the video chunks and audio chunks into a video and an audio respectively and passes the video and audio to the muxer 128 for multiplexing the video and the audio into a complete video file. The muxer 128 sends the complete video file to the streamer for streaming the complete video file to the clients 110.

Figure 2:
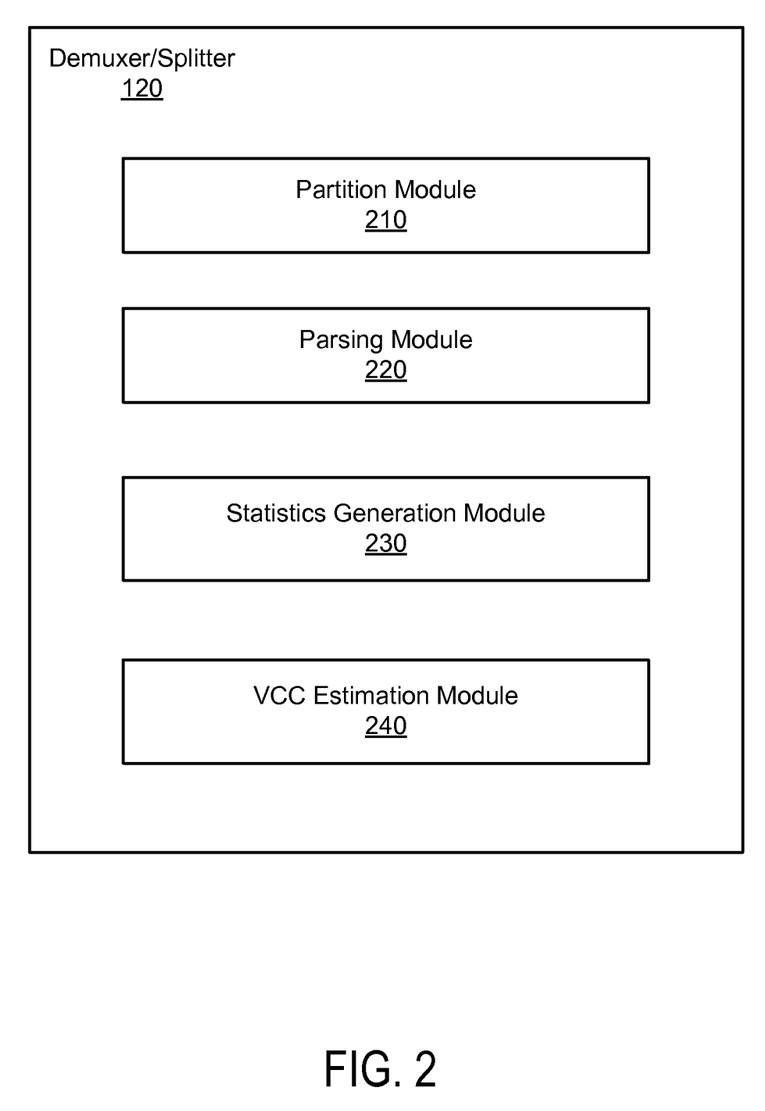
FIG. 2 is a block diagram illustrating a de-multiplexer (demuxer)/splitter of the adaptive transcoding system illustrated in FIG. 1 according to one embodiment.

FIG. 2 is a block diagram of a demuxer/splitter 120 of the adaptive transcoding system 100, according to an illustrative embodiment. In the embodiment illustrated in FIG. 2, the demuxer/splitter 120 has a partition module 210, a parsing module 220 and a statistics generation module 230. The demuxer/splitter 120 receives an intermediate video stream and an intermediate transcoding log stream from the intermediate transcoder 104, partitions the video stream into multiple video chunks, and generates per-chunk video statistics using the intermediate transcoding log stream. The demuxer/splitter 120 communicates with the chunk controller 122 for controlling one or more video chunk transcoder slaves 150 (and one or more audio chunk transcoder salves 152) to perform target video transcoding and audio transcoding in parallel.

The partition module 210 partitions the received intermediate video stream into a sequence including multiple video chunks. Each video chunk corresponds to a portion of video data of the intermediate video stream corresponding to a certain time slot. In one embodiment, a video chunk may be identified by unique video chunk identification and the identification for a subsequent video chunk in the sequence of the video chunks may be incremented by a fixed amount. The video chunk may also be associated with chunk starting and length information.

The partition module 210 can partition a video stream in a variety of ways. In one embodiment, the partition module 210 can partition a video stream into fixed sized video chunks. For example, every 15 seconds of the video data of the video stream may form a video chunk. Alternatively, the fixed size of each video chunk can also be measured in terms of number of video frames. For example, every 100 frames of the video stream may form a video chunk. In one embodiment, the partition module 120 partitions the intermediate video stream into one or more video chunks of multiple frames at the appropriate frame boundaries.

Alternatively, the partition module 210 partitions the video stream into variable sized video chunks, for example, based on the variation and complexity of motion in the video stream. For example, assume the first 5 seconds of the video data of the video stream contain complex video data (e.g., a football match) and the subsequent 20 seconds of the video data are simple and static scenes (e.g., green grass of the football field). The first 5 seconds of the video form a first video chunk and the subsequent 20 seconds of the video clip make a second video chunk. In this manner, the latency associated with rendering the video streams is reduced.

The size of a video chunk is balanced between video transcoding latency and system performance. Choosing larger chunk sizes may increase latency of streaming the video to users, as the adaptive transcoding system 100 cannot start streaming the video until transcoding of the first chunk completes. Care needs to be taken to balance the efficiency of the video transcoding system with the responsiveness of the video transcoding service. For example, the partition module 210 can choose smaller chunk size at the start of video streaming to reduce initial latency and choose larger chunk size later to increase efficiency of the video transcoding system. The chunk sizes can be determined adaptively by the algorithm as the transcoding process goes by. Alternatively, the chunk sizes can be predefined according to experimental results conducted before and applied to the transcoding process.

In one embodiment, the partition module 210 also receives the intermediate transcoding log stream from the intermediate transcoder 104. The log stream can be obtained from the intermediate transcoding of the video stream and describe properties/characteristics of the video stream. For example, the log stream may include multiple entries each describing properties of a frame of the video. Each entry describing properties of a frame of the video can be referred to as per-frame information. Examples for the per-frame information may include, but are not limited to, power signal-to-noise ratio (PSNR) per frame, number of bits spent to encode the motion vector per frame, number of bits spent on predicted coded macro blocks (MBs) per frame, number of bits spent on the intra coded MBs per frame, number of skipped MBs per frame, and one or more average quantization parameters per frame.

The partition module 210 partitions the intermediate transcoding log stream into a sequence of multiple sections of the log stream (also referred to as video log chunks), for example, based on boundaries of the video chunks. Each video log chunk includes a portion of log data of the intermediate transcoding log stream that describes the properties of the corresponding video chunk. In one embodiment, a video log chunk may be identified by a unique video log chunk identification and the identification for a subsequent video log chunk in the sequence of the video log chunks may be incremented by a fixed amount.

The partition module 210 can partition the log stream according to the partition of the video stream. In one embodiment, the partition module 210 can partition the log stream based on the frame boundaries of the video chunks of the video stream. When the video stream is partitioned into fixed sized video chunks, where, e.g., every 200 frames form a video chunk, the partition module 210 can partition the log stream into video log chunks so that each video log chunk includes a portion of log data describing the properties of the 200 frames in each video chunk. The portion of log data may still be formed by per-frame information as described above. One piece of per-frame information describes the properties of the corresponding frame of the video chunk.

Alternatively, when the video stream is partitioned into variable sized video chunks, where different video chunks include different numbers of frames, the partition module 210 can partition the log stream into variable sized video log chunks based on the different number of frames included in each video chunk. In both cases, each video log chunk describes the properties of a corresponding video chunk. Other ways to partition the log stream to generate video log chunks for corresponding video chunks known to those skilled in the related art are possible.

The parsing module 220 receives video chunks and associated video log chunks from the partition module 210 and parses the log data of the video log chunks. For example, the parsing module 220 parses the per-frame information in each video log chunk. In alternative embodiments, the functionality associated with the parsing module 220 may be incorporated into the intermediate transcoder 104 (FIG. 1). For example, the intermediate transcoder 104 parses the per-frame information of the log stream and transmits the parsed per-frame information of the log stream to the partition module 210 for partitioning the parsed per-frame information of the log stream into video log chunks each including a portion of parsed per-frame information for a video chunk.

The statistics generation module 230 generates video statistics for the video chunks using the video log chunks associated with the video chunks. In one embodiment, the statistics generation module 230 aggregates the parsed per-frame information in a video log chunk to generate video statistics describing the video chunk corresponding to the video log chunk. The video statistics describing a video chunk can be referred to as per-chunk video statistics. For example, the per-chunk video statistics describe the power signal-to-noise ratio (PSNR) per video chunk, the number of bits spent to encode the motion vector per video chunk, the number of bits spent on predicted coded MBs per video chunk, the number of bits spent on the intra coded MBs per video chunk, the number of skipped MBs per video chunk, and one or more average quantization parameters per video chunk. Other examples for per-chunk video statistics known to those skilled in the related art are possible.

Similarly, the statistics generation module 230 may also generate metric/statistics for audios de-multiplexed from the video streams. For example, the intermediate transcoding log stream also includes information describing the audio embedded in the video stream. Upon the partition module 210 partitioning the audio into audio chunks, and the information in the log stream describing the audio into audio log chunks associated with the audio chunks, the statistics generation module 230 generates statistics describing each audio chunk based on the audio log chunk associated with the audio chunk (also referred to as per-chunk audio statistics).

The statistics generation module 230 transmit the per-chunk video statistics and per chunk audio statistics to the chunk controller 122 for determining transcoding parameters and passing the parameters to the video chunk transcoder slaves 150 and the audio chunk transcoder slaves 152, respectively, for guiding the transcoding of the video chunks. For example, if per-chunk video statistics specifies that a video chunk is a slide video chunk, the chunk controller 122 may use a relatively low bit rate, for example, lower than a target bit rate of normal videos, to encode the video chunk. In another example, if per-chunk video statistics specifies that a video chunk is a pure noise video chunk, the chunk controller 122 may determine appropriate transcoding parameters, e.g., large values for quantization parameters, large value for dead zone, etc., to suppress unnecessary high bit rate. Furthermore, based on the per-chunk video/audio statistics for the corresponding video chunk/audio chunk, the chunk controller 122 can build rate-quality model to facilitate the transcoding and reduce the chunk boundary quality fluctuation problem.

In one embodiment, a video chunk/an audio chunk and the corresponding per-chunk video statistics/per-chunk audio statistics are transmitted to the chunk controller 122. In one embodiment, some specific transcoding log entries include information useful for all chunks of a video/audio. Therefore, these log entries, along with the per-chunk video statistics/per-chunk audio statistics corresponding to the individual chunk, are streamed down to the chunk controller 122 to facilitate the determination of parameters for transcoding each individual video chunk/audio chunk.

In one embodiment, neighboring per-chunk video/audio statistics are used to facilitate the transcoding. For example, per-chunk video/audio statistics for a video/audio chunk are combined with neighboring per-chunk video statistics/per-chunk audio statistics, e.g., per-chunk video statistics/per-chunk audio statistics for a subsequent and/or a preceding video chunk/audio chunk, to guide the transcoding of the video chunk/audio chunk. The chunk controller 122 receives statistics for both the video chunk/audio chunk and the one or more neighboring video chunks/audio chunks and determines transcoding parameters using the statistics. In one embodiment, the chunk controller 122 compares the per-chunk video/audio statistics for the video/audio chunk and the one or more neighboring video/audio chunks to determine transcoding parameters based on difference resulting from the comparison. In another embodiment, the chunk controller 122 takes the average of the per-chunk video statistics/per-chunk audio statistics for the video chunk/audio chunk and the one or more neighboring video chunks/audio chunks to determine transcoding parameters. Other embodiments for using the per-chunk video statistics/per-chunk audio statistics for the video chunk/audio chunk and the one or more neighboring video/audio chunks to determine transcoding parameters are possible.

Figure 5:
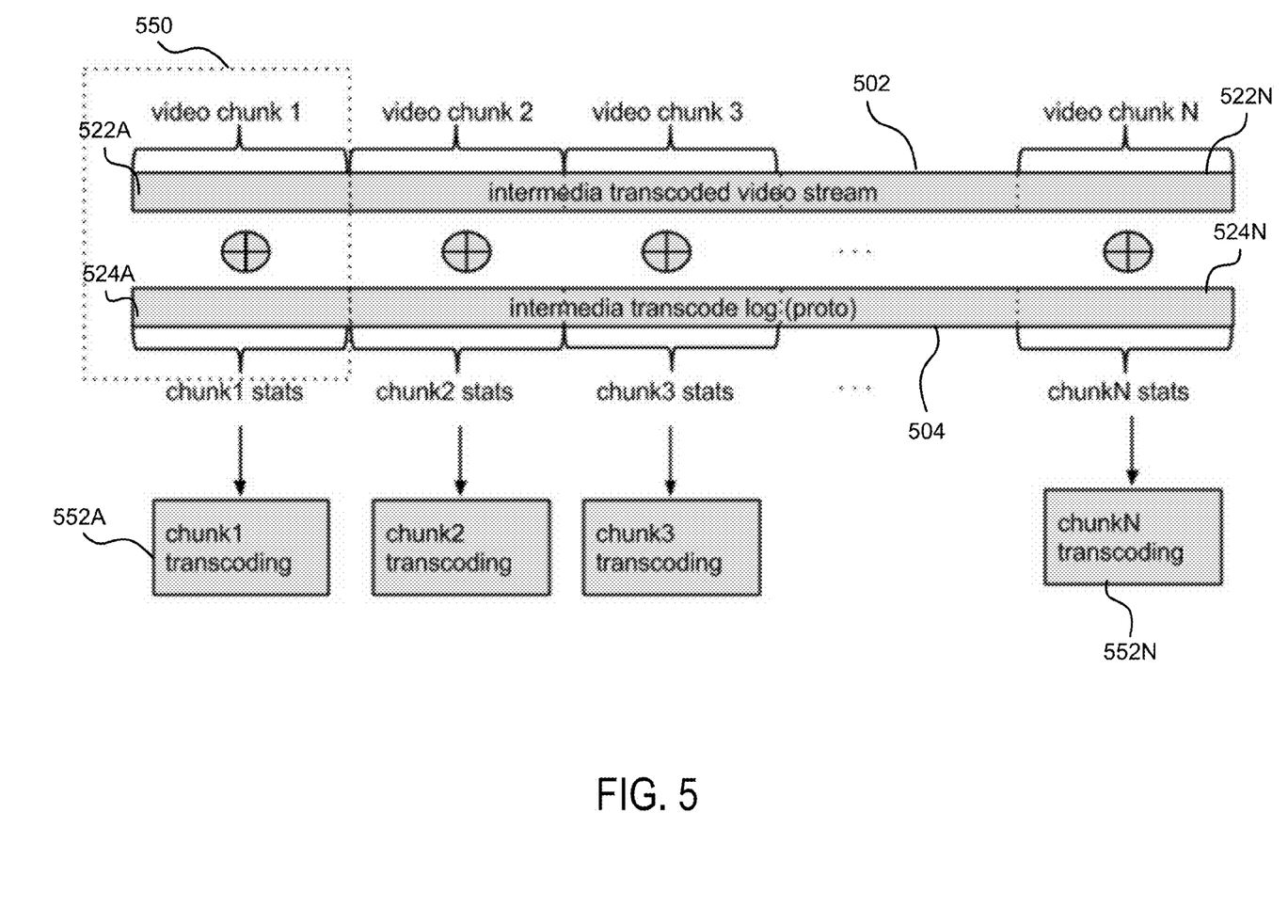
FIG. 5 is a diagram illustrating an example process of adaptive transcoding based on parallel chunked logs according to one embodiment.

To further illustrate the adaptive transcoding based on per-chunk video statistics determined by the statistics generation module 230, FIG. 5 is a diagram illustrating an example process of adaptive transcoding based on parallel chunked log. In the example process illustrated in FIG. 5, sequence 502 represents an intermediate transcoded video stream. The intermediate transcoded video stream 502 is partitioned by the partition module 210 into multiple video chunks, for example, video chunks 522A-522N. Sequence 504 represents an intermediate transcoding log associated with the video stream 502. The intermediate transcoding log 504 is partitioned, by the partition module 210, and used, by the parsing module 220 and the statistic generation module 230, to generate per-chunk video statistics, e.g., per-chunk video statistics 524A-524N, corresponding to the video chunks 522A-522N, respectively. For example, the per-chunk video statistics 524A corresponds to the video chunk 522A. The per-chunk video statistics 524N corresponds to the video chunk 522N.

Box 550 shows the combination of video chunk 522A and corresponding per-chunk video statistics 524A to yield video chunk transcoding process 552A. For example, the corresponding per-chunk video statistics 524A is used by a chunk controller 122 to determine transcoding parameters to transcode the video chunk 522A. Chunk transcoding for other video chunks proceeds in the same way. For example, video chunk transcoding 552N is performed similarly. The corresponding per-chunk video statistics 524N is used by another selected video chunk transcoder slave 150 to determine transcoding parameters to transcode the video chunk 522N. In addition, the video chunk transcoding processes 552A-552N are performed in parallel by the video chunk transcoder slaves 150.

Figure 6:
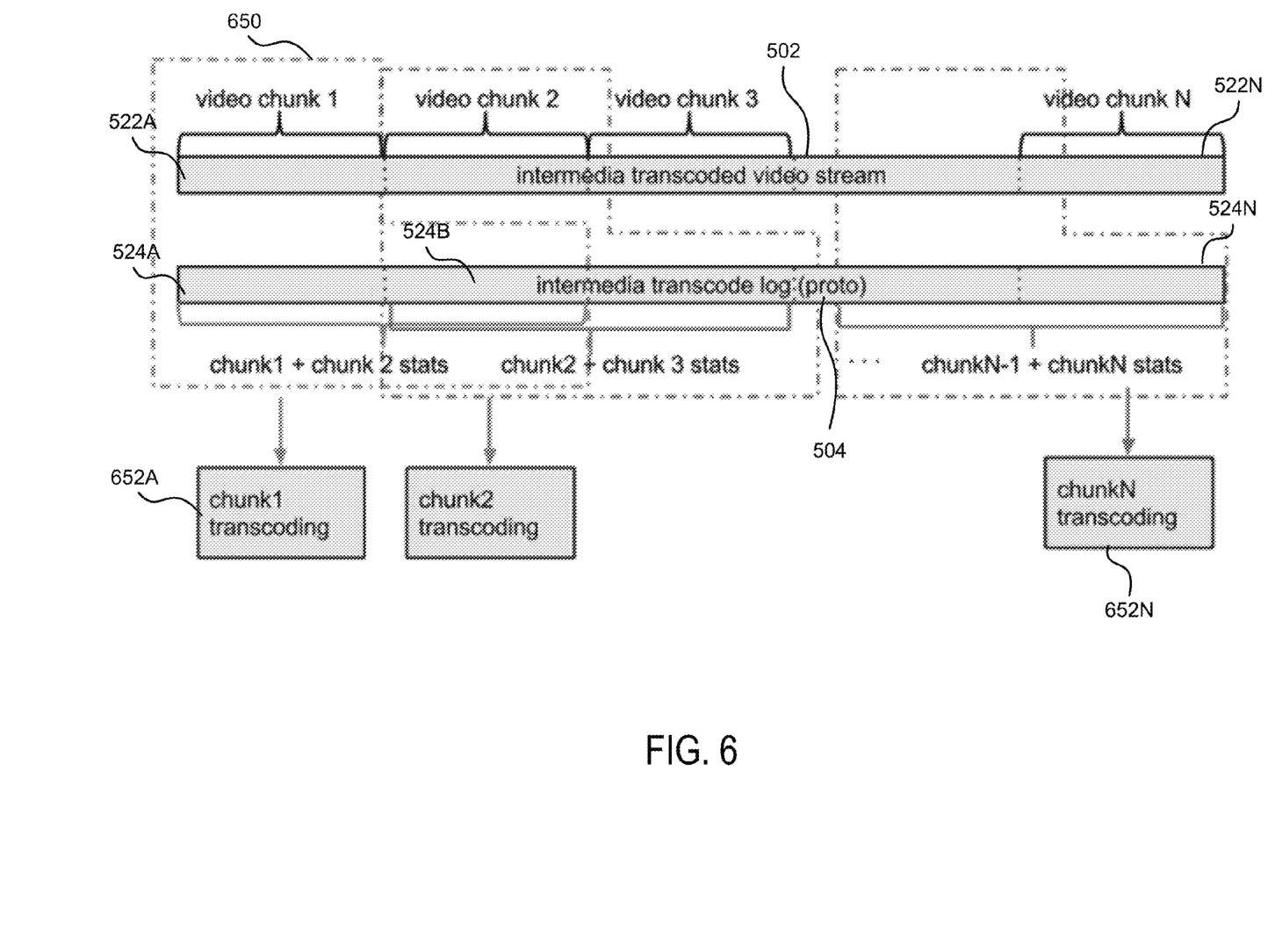
FIG. 6 is a diagram illustrating another example process of adaptive transcoding based on parallel chunked logs according to one embodiment.

Alternatively, FIG. 6 is a diagram illustrating another example process of adaptive transcoding based on parallel chunked logs. Similar to the example process illustrated in FIG. 5, the intermediate transcoded video stream 502 is partitioned into multiple video chunks, for example, video chunks 522A-522N. The intermediate transcoding log 504 is partitioned and used to generate per chunk statistics, e.g., per-chunk video statistics 524A-524N, corresponding to the video chunks 522A-522N, respectively.

The video transcoding process shown in FIG. 6 is different from that shown in FIG. 5, in that neighboring per-chunk video statistics is used, along with the corresponding per-chunk video statistics, for transcoding the video chunks 522A-522N. For example, box 650 shows that the video chunk 522A is combined with per-chunk video statistics 524A and the neighboring (e.g., subsequent) per-chunk video statistics 524B to enable the chunk transcoding 652A for video chunk 522A. For example, the corresponding per-chunk video statistics 524A and the subsequent per-chunk video statistics 524B are combined by a chunk controller 122 to determine transcoding parameters to transcode the video chunk 522A. The video chunk transcoding 652N is performed similarly. The video chunk transcoding processes 652A-652N are performed in parallel by the video chunk transcoder slaves 150.

Referring back to FIG. 2, the video coding complexity (VCC) estimation module 240 estimates video coding complexity (VCC) for videos/video chunks. Video coding complexity (VCC) for a video/video chunk is a metric to describe how complex the video/video chunk is from encoding potion of view. In general, the VCC for a video/video chunk may be proportional to the amount of spatial and motion information contained in the video/video chunk. For example, varying contents in scenes captured in a video/video chunk contain various amount of information in the video/video chunk. Variations in the spatial and temporal characteristics of a video/video chunk lead to different coding complexity of the video/video chunk. The more interesting information, e.g., animation, motion, colors, objects, etc., a video/video chunk has, the more complex the video/video chunk is.

In one embodiment, the VCC estimation module 240 estimates the complexity of a video/video chunk for coding based on one or more spatial and/or temporal features of the video/video chunk. For example, the complexity estimation of a video/video chunk is computed based on temporal, spatial and color space information of the video/video chunk (e.g., motion and texture information, PSNR of each color channel, etc.). Other coding parameters, such as universal workload of encoding the video, can be used in video complexity estimation. In on embodiment, the VCC of a video/video chunk is a vector, instead of a single number. For example, the VCC vector has fields of average variance of motion-compensated MB residual, standard deviation of motion-compensated MB residual, average number of bits to code motion vectors for each MB, standard deviation of number of bits to code motion vectors of each MB, percentage of skipped MBs, percentage of intra MBs, and an overall score by combining the above various VCC vector fields.

The chunk controller 122 can use the video complexity estimation, as well as the per-chunk video statistics, to guide video transcoding. For example, the chunk controller 122 determines transcoding parameters for a video chunk based on the per-chunk video statistics, the VCC of the video chunk, as well as some other information. The chunk controller 122 passes the transcoding parameters for the video chunk to a selected video chunk transcoder slave 150 for guiding the encoding of the video chunk. For example, for video chunks with small VCC (such as slide video chunks), the minimum value for the quantization parameter (qp) is increased. For video chunks with large VCC (such as sports or high texture video chunks), the maximum value for the qp is increased. For video chunks with medium VCC, the qp value is set to a medium range. In another example, the chunk controller 122 guides the video chunk transcoder slave 150 to allocate more bits to complex video chunks (e.g., video chunks with high VCC) than to simple video chunks (e.g., video chunks with low VCC). Furthermore, the chunk controller 122 may also determine different motion search range based on different complexity of video chunks.

In this way, based on the parsed intermediate transcoding logs and estimated video coding complexity based on the intermediate transcoding logs, the chunk controller 122 can adaptively assign transcode parameters for the next encoding stage—target encoding stage based on the video coding complexity of each video chunk.

By using the VCC, as well as the per-chunk video statistics to guide transcoder rate control, the adaptive transcoding system can achieve quality based content adaptive coding, which improves video quality given certain resource budget and makes encoding more efficient. Compared with one-fits-all transcoding strategy, the adaptive transcoding system treats videos/video chunks with different complexities differently. For example, the adaptive transcoding system spends fewer bits and applies proper encoding parameters on simple videos/video chunks, while spending more bits and applying different proper encoding parameters on complex videos/video chunks. Therefore, the VCC for video chunks, as well as the per-chunk video statistics allows the transcoding system to adapt transcoding parameters based on video content, and therefore avoid limitations of using one-fits-all transcoding parameters to transcode videos (for example, jitter, i.e., chunk quality variation between simple and complex chunks in one video) and achieve certain pre-defined video quality for transcoding.

Figure 3:
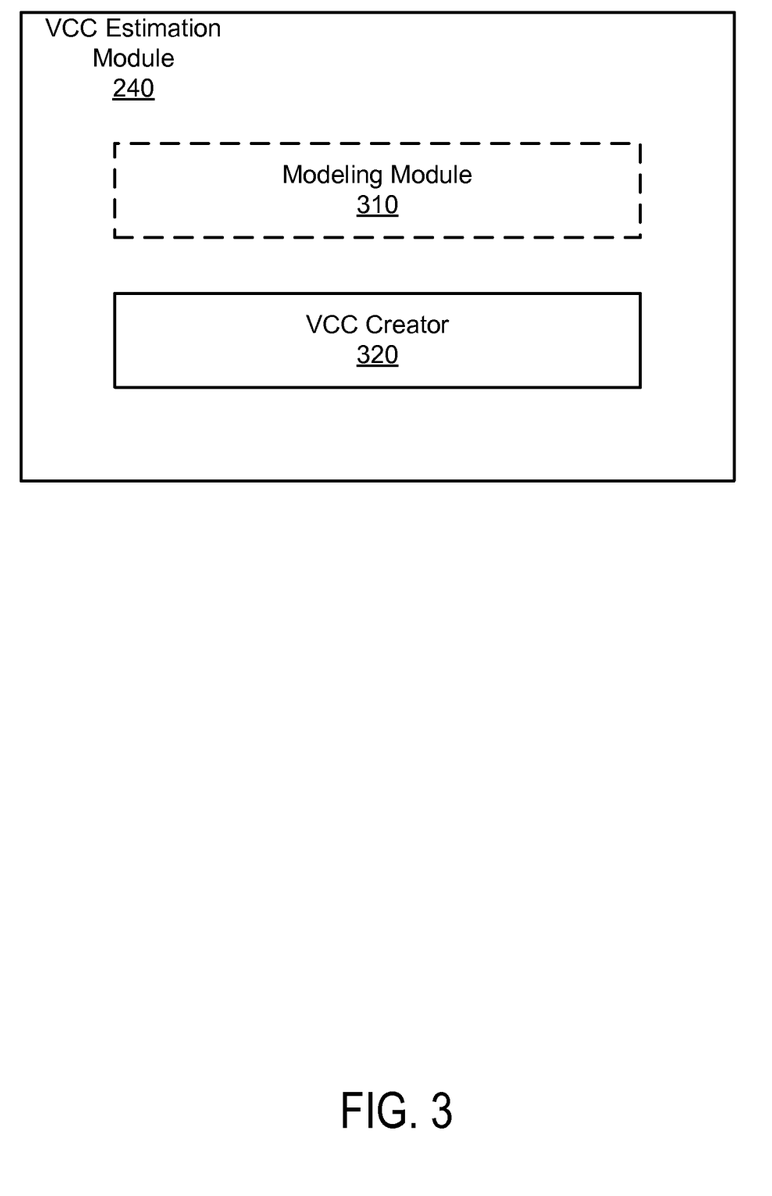
FIG. 3 is a block diagram illustrating a video coding complexity (VCC) estimation module in the de-multiplexer (demuxer)/splitter of the adaptive transcoding system illustrated in FIG. 1 according to one embodiment.

Referring to FIG. 3, a block diagram of a VCC estimation module 240 of the demuxer/splitter 120 is illustrated according to one embodiment. In the embodiment illustrated in FIG. 3, the VCC estimation module 240 has a modeling module 310 and a VCC creator 320. The modeling module 310 is depicted using a dashed line in FIG. 3 to indicate that it can be an optional component of the VCC estimation module 240. For example, the modeling module 310 can perform functions offline and can be stored in other servers. The results from the modeling module 310 can be stored in database accessible to the VCC estimation module 240 for estimating the VCC in real-time. Other embodiments of VCC estimation module 240 may include different and/or additional modules.

In addition, the functions may be distributed among the modules in a different manner than described herein.

The modeling module 310 receives a set of videos from a variety of resources and extracts multiple features from the set of videos. The modeling module 310 also selects one or more features from the multiple extracted features, and generates a VCC model based on the selected features. For example, the modeling module 310 may cooperate with the intermediate transcoder 104 and other components of the demuxer/splitter 120 (such as the partition module 210, the parsing module 220 and/or the statistics generation module 230) to obtain the intermediate transcoding log chunks and/or per-chunk video statistics. The modeling module 310 extracts and selects features (such as those fields in the VCC vector described above) from the parsed transcoding log chunks and/or per-chunk video statistics and builds VCC model using machine learning techniques. For example, the VCC model is a linear/nonlinear combination of the log entries from the parsed transcoding log chunks.

In one embodiment, the modeling module 310 uses a second set of videos to train the VCC model. By applying VCC vectors estimated by the VCC model on the second set of videos, the modeling module 310 refines the VCC model to obtain more accurate estimates of VCC vectors. For example, the modeling module 310 trains coefficients of the VCC model using regression tests. Specifically, the modeling module 310 uses the VCC model having a set of coefficients to estimate VCCs for videos in the second set, and adjusts the set of coefficients such that the estimated VCCs approach the real complexities of the videos. In this way, the modeling module 310 can obtain a set of optimized coefficients for the VCC model.

In one embodiment, the modeling module 310 can be an optional component of the VCC estimation module 240, and be stored separately from the adaptive transcoding system 100, for example, in one or more other servers. That is, the modeling of the VCC model can be performed offline, and the built VCC model can be stored for accessing by the adaptive transcoding system 100 when performing the adaptive transcoding of videos. In addition, the VCC model can be updated during the adaptive transcoding processes.

The VCC creator 320 applies the VCC model to estimate VCC vectors of videos for guiding transcoding of the videos. For example, the VCC creator 320 receives video chunk information (such as chunk start and duration) and parsed log chunks, and estimates VCC vectors for the video chunk using the VCC model. In one embodiment, the VCC creator 320 stores the VCC vector in a big table.

Figure 4:
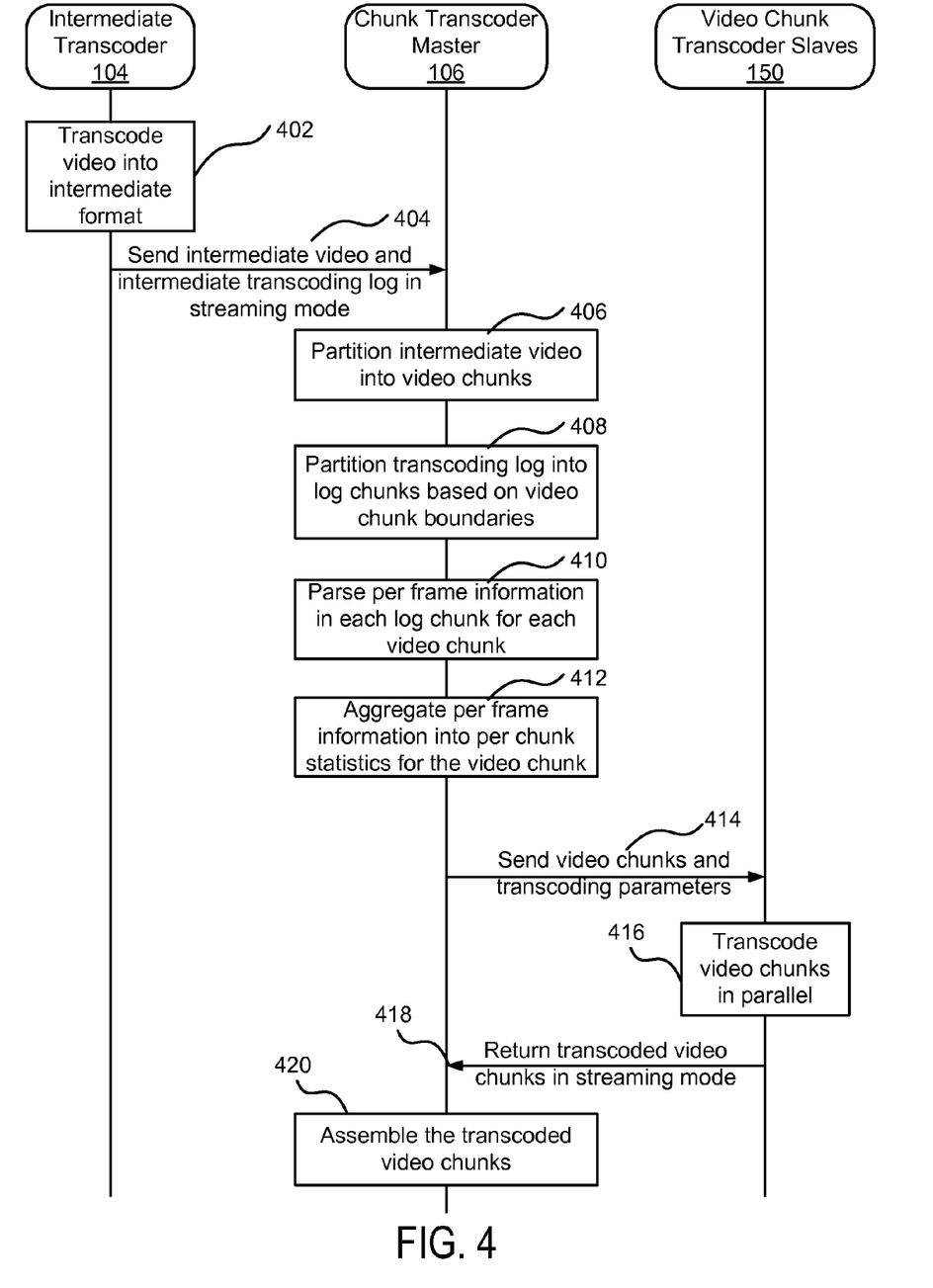
FIG. 4 is a flow diagram of interactions among an intermediate transcoder, a chunk transcoder master and a pool of video/audio chunk transcoder slaves of the adaptive transcoding system illustrated in FIG. 1 according to one embodiment.

FIG. 4 is a flow diagram of interactions among an intermediate transcoder 104, a chunk transcoder master 106 and a pool of video chunk transcoder slaves 150 of the adaptive transcoding system 100 illustrated in FIG. 1. Initially, the intermediate transcoder 104 transcodes 402 a video into a universal intermediate format. In one embodiment, the intermediate transcoder 104 also generates intermediate transcoding log for the video. The intermediate transcoder 104 sends 404 the intermediate video and the transcoding log to the chunk transcoder master 106 in streaming mode. For example, the intermediate transcoder 104 transmits an intermediate video stream and a transcoding log stream to the chunk transcoder master 106.

In responsive to receiving the intermediate video stream and the transcoding log stream, the chunk transcoder master 106 partitions 406 the intermediate video into video chunks. For example, each video chunk includes a certain number of frames of the video within a certain time slot. The chunk transcoder master 106 partitions 408 the transcoding log into log chunks based on the video chunk boundaries. For example, the chunk transcoder master 106 partitions the transcoding log such that each log chunk describes properties of a corresponding video chunk. In one embodiment, each log chunk includes a portion of per-frame information describing properties of the frames in each video chunk.

The chunk transcoder master 106 parses 410 the per-frame information in each log chunk associated with each video chunk. The chunk transcoder master 106 aggregates 412 the parsed per-frame information into per-chunk video statistics for the video chunk. In one embodiment, the chunk transcoder master 106 also determines transcoding parameters for each video chunk based on the per-chunk video statistics. The chunk transcoder master 106 sends 414 the video chunks and the transcoding parameters to the video chunk transcoder slaves 150. For example, the chunk transcoder master 106 sends each video chunk and its transcoding parameters to a selected video chunk transcoder slave 150 so that the multiple video chunk transcoder controllers 122 can transcode the video chunks in parallel.

The video chunk transcoder slaves 150 transcode 416 the video chunks based on the transcoding parameters in parallel and returns 418 transcoded video chunks to the chunk transcoder master 106. The chunk transcoder master 106 assembles the transcoded video chunks into a target video stream.

The features and advantages described in the specification are not all inclusive and, in particular, many additional features and advantages will be apparent to one of ordinary skilled in the art in view of the drawings, specification, and claims. Moreover, it should be noted that the language used in the specification has been principally selected for readability and instructional purposes, and may not have been selected to delineate or circumscribe the disclosed subject matter.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention. For example, the operation of the preferred embodiments illustrated above can be applied to other media types, such as audio, text and images.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by real time network operating systems.

The invention also relates to an apparatus for performing the operations herein. This apparatus may be specially constructed for the required purposes, or it may comprise a general-purpose computer selectively activated or reconfigured by a computer program stored on a computer readable storage medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the art, along with equivalent variations. In addition, the invention is not described with primary to any particular programming language. It is appreciated that a variety of programming languages may be used to implement the teachings of the invention as described herein, and any reference to specific languages are provided for disclosure of enablement and best mode of the invention.

The invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the following claims.

What is claimed is:

1. A computer-implemented method for adaptive video transcoding based on parallel chunked log analysis, the method comprising:
   receiving, by a computer, an intermediate video stream generated from an intermediate transcoding, the intermediate video stream having an intermediate format;
   receiving, by the computer, an intermediate transcoding log stream associated with the intermediate video stream;
   partitioning the intermediate video stream into a plurality of video chunks, each video chunk corresponding to a portion of video data of the video stream;
   generating video chunk statistics for each of the video chunks using the intermediate transcoding log stream by:
      partitioning, based on boundaries of the video chunks, the intermediate transcoding log stream into a sequence of a plurality of video log chunks, a video log chunk associated with a video chunk and including a portion of log data of the log stream; and
      generating a per-chunk video statistics based on a video log chunk, the per-chunk video statistics describing statistic properties for a video chunk associated with the video log chunk;
   generating transcoding parameters for each of the video chunks based on the generated video chunk statistics;
   transcoding each of the video chunks to a target format by a plurality of chunk transcoders operating in parallel using the generated transcoding parameters; and
   assembling the transcoded video chunks into a target video stream in the target format.

2. The method of claim 1, wherein the portion of log data included in the video log chunk comprises per-frame information describing properties for each frame of the associated video chunk.

3. The method of claim 2, wherein generating the per-chunk video statistics based on the video log chunk comprising:
   parsing the per-frame information in the video log chunk; and
   aggregating the parsed per-frame information to generate the per-chunk video statistics.

4. The method of claim 2, wherein the per-frame information comprises power signal-to-noise ratio per frame, number of bits spent to encode the motion vector per frame, number of bits spent on predicted coded macro blocks (MBs) per frame, number of bits spent on the intra coded MBs per frame, number of skipped MBs per frame, and one or more average quantization parameters per frame.

5. The method of claim 1, wherein generating the transcoding parameters for the video chunks based on the video chunk statistics comprising:
   receiving per-chunk video statistics for a video chunk by a chunk controller; and
   generating, by the chunk controller, transcoding parameters for transcoding the video chunk based on the per-chunk video statistics for the video chunk.

6. The method of claim 1, wherein generating the transcoding parameters for the video chunks based on the video chunk statistics comprising:
   receiving per-chunk video statistics for a first video chunk and a second video chunk adjacent to the first video chunk by a chunk controller; and generating, by the chunk controller, transcoding parameters for transcoding the first video chunk based on the per-chunk video statistics for the first video chunk and the second video chunk.

7. The method of claim 1 further comprising:
generating video coding complexity for the video chunks based on the intermediate transcoding log stream;
wherein generating the transcoding parameters for the video chunks is also based on the video coding complexity for the video chunks.

8. A non-transitory computer-readable storage medium storing executable computer program instructions for adaptive video transcoding based on parallel chunked log analysis, the computer program instructions comprising instructions for:
receiving, by a computer, an intermediate video stream generated from an intermediate transcoding, the intermediate video stream having an intermediate format;
receiving, by the computer, an intermediate transcoding log stream associated with the intermediate video stream;
partitioning the intermediate video stream into a plurality of video chunks, each video chunk corresponding to a portion of video data of the video stream;
generating video chunk statistics for each of the video chunks using the intermediate transcoding log stream by:
partitioning, based on boundaries of the video chunks, the intermediate transcoding log stream into a sequence of a plurality of video log chunks, a video log chunk associated with a video chunk and including a portion of log data of the log stream; and
generating a per-chunk video statistics based on a video log chunk, the per-chunk video statistics describing statistic properties for a video chunk associated with the video log chunk;
generating transcoding parameters for each of the video chunks based on the generated video chunk statistics;
transcoding each of the video chunks to a target format by a plurality of chunk transcoders operating in parallel using the generated transcoding parameters; and
assembling the transcoded video chunks into a target video stream in the target format.

9. The computer-readable storage medium of claim 8, wherein the portion of log data included in the video log chunk comprises per-frame information describing properties for each frame of the associated video chunk.

10. The computer-readable storage medium of claim 9, wherein generating the per-chunk video statistics based on the video log chunk comprises:
parsing the per-frame information in the video log chunk; and
aggregating the parsed per-frame information to generate the per-chunk video statistics.

11. The computer-readable storage medium of claim 9, wherein the per-frame information comprises power signal-to-noise ratio per frame, number of bits spent to encode the motion vector per frame, number of bits spent on predicted coded macro blocks (MBs) per frame, number of bits spent on the intra coded MBs per frame, number of skipped MBs per frame, and one or more average quantization parameters per frame.

12. The computer-readable storage medium of claim 8, wherein generating the transcoding parameters for the video chunks based on the video chunk statistics comprises:
receiving per-chunk video statistics for a video chunk by a chunk controller; and
generating, by the chunk controller, transcoding parameters for transcoding the video chunk based on the per-chunk video statistics for the video chunk.

13. The computer-readable storage medium of claim 8, wherein generating the transcoding parameters for the video chunks based on the video chunk statistics comprises:
receiving per-chunk video statistics for a first video chunk and a second video chunk adjacent to the first video chunk by a chunk controller; and
generating, by the chunk controller, transcoding parameters for transcoding the first video chunk based on the per-chunk video statistics for the first video chunk and the second video chunk.

14. The computer-readable storage medium of claim 8, wherein the computer program instructions further comprises instructions for:
generating video coding complexity for the video chunks based on the intermediate transcoding log stream;
wherein generating the transcoding parameters for the video chunks is also based on the video coding complexity for the video chunks.

15. A computer system for adaptive video transcoding based on parallel chunked log analysis, the system comprising:
a processor;
memory storing a splitter for:
receiving, by a computer, an intermediate video stream generated from an intermediate transcoding, the intermediate video stream having an intermediate format;
receiving, by the computer, an intermediate transcoding log stream associated with the intermediate video stream;
partitioning the intermediate video stream into a plurality of video chunks, each video chunk corresponding to a portion of video data of the video stream;
generating video chunk statistics for each of the video chunks using the intermediate transcoding log stream by:
partitioning, based on boundaries of the video chunks, the intermediate transcoding log stream into a sequence of a plurality of video log chunks, a video log chunk associated with a video chunk and including a portion of log data of the log stream; and
generating a per-chunk video statistics based on a video log chunk, the per-chunk video statistics describing statistic properties for a video chunk associated with the video log chunk;
a chunk controller for:
generating transcoding parameters for each of the video chunks based on the generated video chunk statistics;
the one or more chunk transcoders for:
transcoding each of the video chunks in parallel using the generated transcoding parameters; and
a merger for:
assembling the transcoded video chunks into a target video stream in the target format.

16. The system of claim 15, wherein the portion of log data included in the video log chunk comprises per-frame information describing properties for each frame of the associated video chunk.

17. The system of claim 16, wherein generating the per-chunk video statistics based on the video log chunk comprising:
parsing the per-frame information in the video log chunk; and
aggregating the parsed per-frame information to generate the per-chunk video statistics.

\* \* \* \* \*